Dec. 31, 1963  R. O. CHAMBERS ETAL  3,115,789
SPEED CHANGE TRANSMISSION
Filed Oct. 5, 1961  4 Sheets-Sheet 1

INVENTORS.
ROBERT O. CHAMBERS
GEORGE W. EGER JR.
BY CHARLES A. RAMSEL

Fryer and Timwold
ATTORNEYS

INVENTORS.
ROBERT O. CHAMBERS
GEORGE W. EGER JR.
BY CHARLES A. RAMSEL

ATTORNEYS 3,115,789
SPEED CHANGE TRANSMISSION
Robert O. Chambers, Elmwood, George W. Eger, Jr., and Charles A. Ramsel, Peoria, Ill., assignors to Caterpillar Tractor Co., Peoria, Ill., a corporation of California
Filed Oct. 5, 1961, Ser. No. 143,211
8 Claims. (Cl. 74—688)

This invention relates to a planetary type transmission having a torque converter and providing six forward and one reverse speeds, all selectable through actuation of a combination of five stationary brakes and one rotating clutch.

While the transmission of the present invention is generally applicable for use with a wide variety of vehicles, the numerous unique features present in its design make it particularly suited for use in a vehicle required to travel over rough terrain as well as roads, bear heavy loads, and be able to operate smoothly at low speeds under full load. At the same time the transmission of the present invention provides a vehicle with the ability to cruise at relatively fast speeds and employ dynamic braking. All of these features are present in the invention, plus minimum weight and size. To provide a vehicle with such operating characteristics the transmission of the present invention combines in a novel manner planetary transmission components with a split drive torque converter. The novel arrangement of the various parts of the present invention provides efficient operation of each and every component with a resulting transmission of superior performance characteristics in spite of its light weight, small size, and minimum complexity.

It is an object of the present invention to provide a vehicle transmission capable of operation at a variety of speeds and ranges without obtaining excessively high relative speeds between components and which can be shifted under load at full throttle settings in either forward or reverse.

It is another object of the present invention to provide a vehicle transmission which employs five stationary brakes and a single rotating clutch for the selection of various speeds and ranges; which has good converter braking characteristics; and has good efficiency and performance particularly at high speeds.

Further objects and advantages of the invention are made apparent in the following specification wherein a preferred embodiment of the invention is described in detail by reference to the accompanying drawings.

Figure 1:
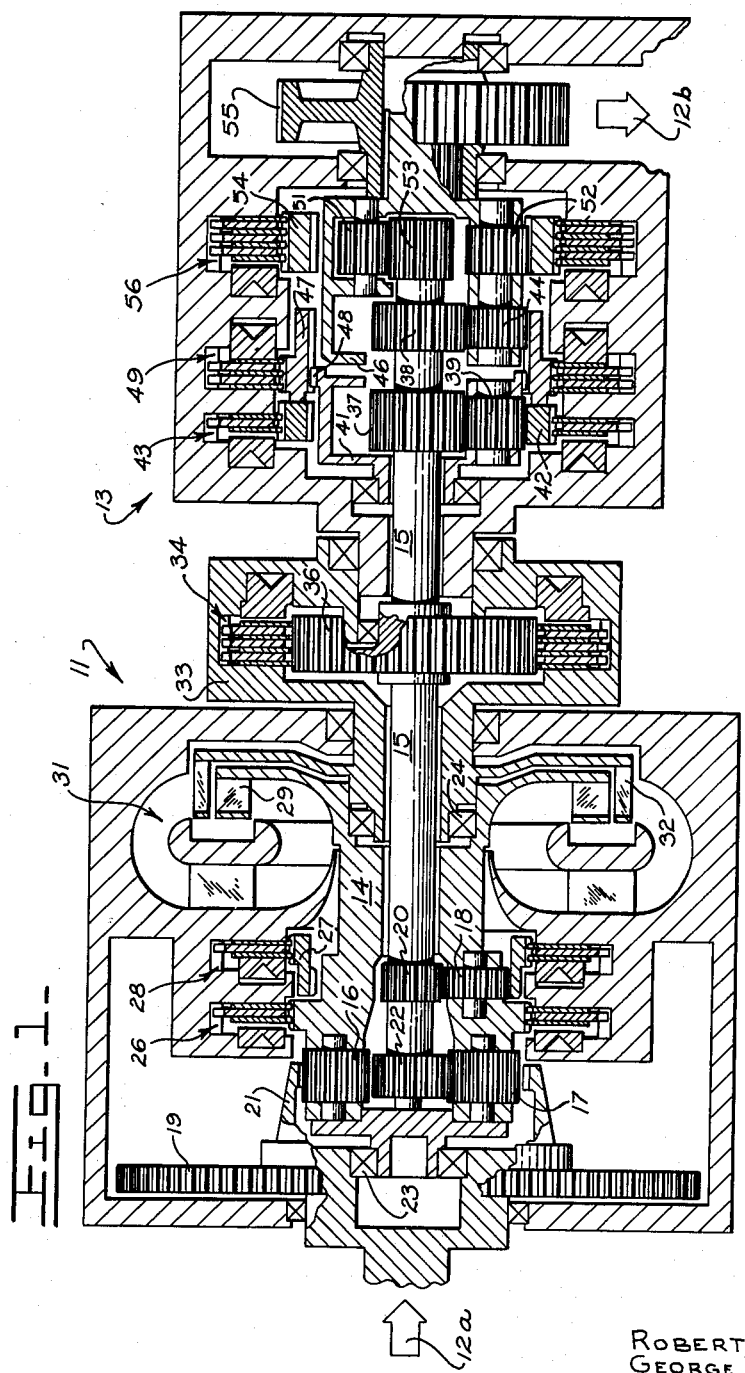
FIG. 1 is a schematic side elevation sectional view of the transmission of the present invention wherein various parts are broken away for purposes of clarity.

Referring now to FIG. 1, the transmission has a forward section 11 which receives power, indicated by arrow 12a from an engine (not shown) and a rear or output section 13 which delivers power, indicated by arrow 12b, to driven mechanism (not shown). Forward section 11 and rear section 13 are mechanically coupled by means of a common shaft 15 which lies along the axis of the transmission.

In the front section 11, carrier 14 supports a first planetary system formed by planets 16 and 17 which mesh with each other, and a second planetary system formed by planets 18. Incoming power 12a drives engine flywheel 19 to which is rigidly affixed a ring gear 21. Ring gear 21 rotates the planets of the first planetary system through engagement with planets 16. Planets 17 mesh with a sun gear 22 causing rotation thereof in the same direction as flywheel 19 and directs power to shaft 15 on which sun gear 22 is mounted. Carrier 14, which is rotatable on bearings 23 and 24, rotates in response to the reaction of planets 17 against sun 22. Carrier 14 can, however, be held stationary by a first brake 26 which is splined to carrier 14. Planets 18 mesh with rotatable ring gear 27 and sun gear 20 mounted on shaft 15. Ring gear 27 can also be prevented from rotation through the action of a second brake 28 which is splined thereto and when brake 28 is activated to hold ring 27 stationary, the ring provides a reaction member for planets 18. Also connected to carrier 14 is the impeller 29 of a three member single stage torque converter 31 of the stationary housing type. Rotation of impeller 29 induces rotation of torque converter turbine 32 in a conventional manner. Connected to turbine 32 is a rotating assembly 33 forming part of a rotating clutch 34. Splined to clutch 34 is a disc 36 which is mounted on shaft 15. The connection between clutch 34 and disc 36 is such that when disengaged clutch 34 allows rotation of member 33 without the rotation being transmitted to disc 36, and when engaged member 33 is locked to disc 36 allowing the rotation of turbine 32 to be transmitted through member 33, clutch 34 and gear 36 to shaft 15.

By the activation of either brake 26 or brake 28 or the engagement of clutch 34 one of three possible drive conditions is selected for transmitting power through shaft 15 to the rear section 13 of the transmission. Activation of brake 26 will retard rotation of carrier 14 and thereby produce the highest speed operation of the front portion of the transmission. Brake 28, which produces an overdrive condition similar to that produced by brake 26, holds ring gear 27 stationary to obtain a slightly lower overdrive condition in the front section of the transmission. For low range high torque conditions, the torque converter 31 is linked into the system by engagement of rotating clutch 34. Rotation of shaft 15 drives output sun gears 37 and 38 mounted thereon and located in the rear section 13 of the transmission. Sun gear 37 drives a first output planetary system formed by output planets 39 which are mounted on a carrier 41 and in engagement with an output ring gear 42. When activated, a third brake 43 splined to ring gear 42 locks the ring gear 42 against rotation. Sun gear 38 drives a second output planetary system formed by output planets 44 which are mounted on a rotatable carrier 46 and are in engagement with a second output ring gear 47. The two output planetary systems are connected by ring gear 47 which is in engagement with a ring gear 48 formed on carrier 41. The rotation of ring gear 47 can be prevented by a fourth brake 49 which is splined thereto.

Also mounted on carrier 46 is a reversing planetary system formed by planets 51 and 52 which mesh with one another and which are driven by a sun gear 53 mounted on shaft 15. Planets 52 engage a ring gear 54, the rotation of which is controlled by a brake 56 which is splined thereto. Mounted on carrier 46 is output gear 55 through which output power 12b is transmitted.

The forward section 11 of the transmission is capable of rotating shaft 15 at one of three speeds depending upon which brakes 26, 28 or clutch 34 is activated. The speed selected in the rear section is operated in a range determined by which of brakes 43 or 49 are activated, to select the two possible reduction gearings of the output section. Thus the transmission has six different forward gear arrangements. Brake 56 is activated simultaneously with clutch 34 when reverse operation is desired.

Figure 2:
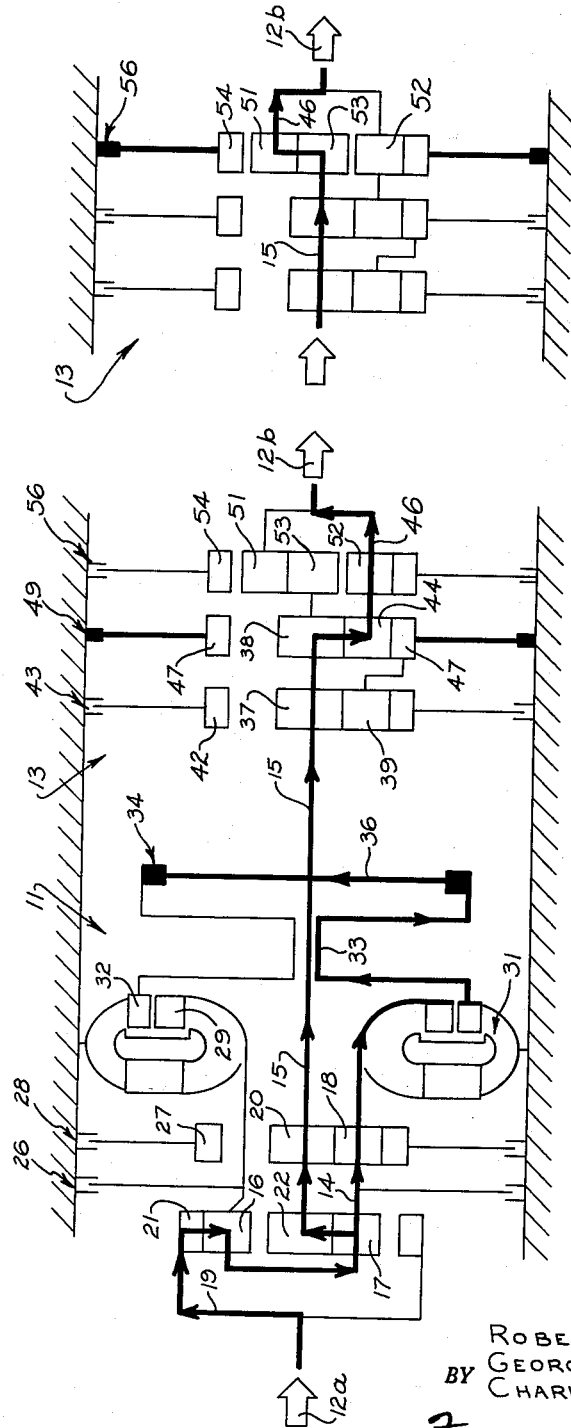
FIGS. 2 through 7 are schematic illustrations of the flow of power through the transmission of FIG. 1 for the various conditions presented by the different clutch and brake engagement patterns.

Reference to the various schematic illustrations along with FIG. 1 will more clearly illustrate the paths followed by the power in passing through the transmission in response to the variety of brake and clutch combinations. Referring first to FIG. 2a there is illustrated the path followed when low range high torque condition is desired, this generally being referred to as low gear. To achieve this power path, clutch 34 is engaged and brake 49 is activated. Incoming power 12a is transmitted through flywheel 19 to ring gear 21 which engages the first planetary system through planets 16 and 17 to supply a portion of the incoming power to sun gear 22 which, in turn, transmits the power to the drive shaft 15. A larger portion of the power, however, is transmitted through rotating carrier 14 to torque converter 31, where the engagement of clutch 34 allows the high torque output of torque converter 31 to be transmitted to shaft 15. Thus, shaft 15 receives rotation from torque converter 31 as well as the first planetary stage. In the rear section 13, rotating shaft 15 freely rotates sun gear 37 since brake 43 is not activated. Brake 49, however, is activated to prevent rotation of ring gear 47 thereby causing planets 44 to walk around ring gear 47 and thereby rotate carrier 46. The output gear 55 being mounted on carrier 46 rotates therewith and transmits the output power 12b. Although the planets of the reversing planetary system also rotate with carrier 46, the ability of ring gear 54 to rotate due to the unactivated state of brake 56 prevents this system from being effective.

Although a slight loss in efficiency is experienced by directing the power through torque converter 31, the high torque output and broader range of operation realized by so directing the power allows smooth operation of the vehicle at low speed and high load and therefore more than compensates for the small loss in efficiency.

To operate the transmission in reverse gear, clutch 34 is engaged and brake 56 is activated. The power flow through the front section 11 of the transmission is identical with that followed during low gear operation, described above, but flows through the rear section 13 as illustrated in FIG. 2b. The engagement of brake 56 prevents rotation of ring gear 54 to enable it to serve as a reaction member for planets 52. Planets 52 are rotated by the planets 51 which are induced to rotate by sun 53 mounted on rotating shaft 15. Reversing planets 51 induce planets 52 to walk around ring gear 54 in a direction opposite to that of shaft 15. Consequently, carrier 46 to which the reversing planets are mounted will rotate in a direction opposite to shaft 15 and thereby provide output rotation in a reverse direction.

Figure 3:
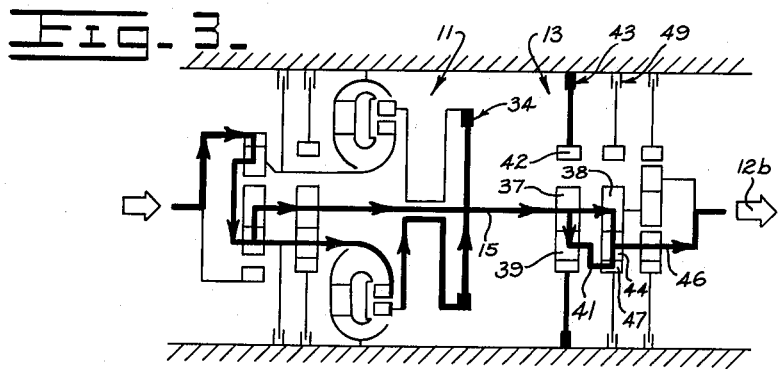

To produce an operating condition of high torque but slightly higher speed than in low gear clutch 34 and brake 43 are activated to produce the power path illustrated in FIG. 3. Again the flow of power through the front section 11 of the transmission is identical with that described with reference to FIG. 2a for low gear. In the rear section 13, however, activation of brake 43 prevents rotation of ring gear 42 which causes planets 39 of the third planetary stage to walk around the ring gear in response to the power delivered to them from sun gear 37 which is rotated by shaft 15. In walking around the ring gear 42 planets 39 rotate carrier 41 which is splined to ring gear 47 of the second output planetary stage, inducing rotation thereof. Ring gear 47 is thus rotated in a direction which is the same as the rotation imparted to sun gear 38 by shaft 15. Rotation of sun gear 38 and ring gear 47 in the same direction causes planets 44 and carrier 46 to which they are mounted to walk around ring gear 47 at a speed greater than when ring gear 47 is merely held stationary. Consequently, the output 12b is at a speed greater than that produced in low gear when brake 49 is activated. An important feature of the transmission of the present invention is the manner in which the power in the rear section is divided between two planetary systems in driving the output. This enables the use of gears and associated component parts of smaller size than would be possible were the load driven by a single planetary system. Wheel slippage normally prevents the potential high torque from being felt by the single planetary system utilized in the rear portion of the transmission in low gear.

Figure 4:
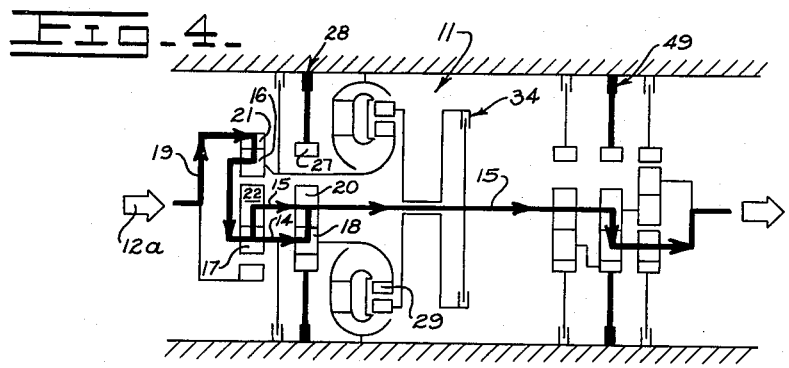

For lower torque and higher speed operation, brakes 28 and 49 are activated to produce the power path illustrated in FIG. 4. Incoming power 12a is transmitted through flywheel 19 to ring gear 21 which delivers power to shaft 15 through the first planetary system and sun gear 22. Rotation of planets 16 and planets 17 causes rotation of carrier 14 on which they are mounted which, in turn, rotates the second planetary system similarly mounted thereon. (It is to be noted that with clutch 34 in the disengaged state, impeller 29 is unable to transmit power through to shaft 15.) Planets 18 of the second planetary system walk around their associated ring gear 27 which by being held stationary by brake 28 acts as a reaction member. With carrier 14 rotating planets 18 and ring gear 27 held stationary, power is transmitted through the rotating planets to their associated sun gear 20. Thus, both of the planetary systems in the front section 11 of the transmission participate in transmitting power to shaft 15. The power path through the rear section of the transmission is selected by activating brake 49 which produces a path identical with that described in connection with low gear and FIG. 2a.

Figure 5:
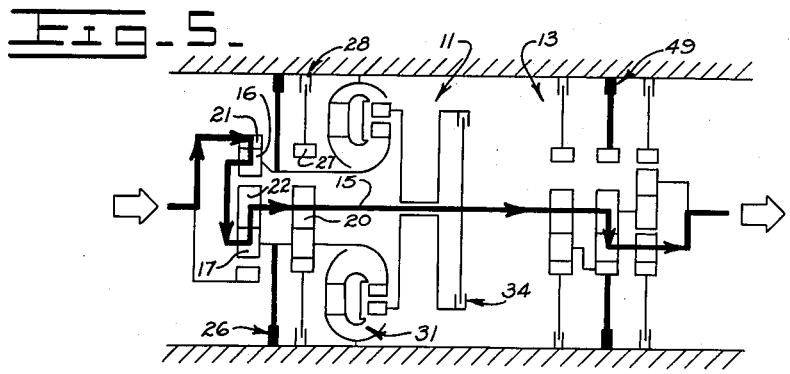

To achieve still higher speed operation the gear reduction in the forward section 11 of the transmission is reduced by activating brake 26 rather than brake 28 to form the path illustrated in FIG. 5. Here, a single planetary stage, namely the first stage, drives shaft 15 from power received through ring gear 21 acting on planets 16 and planets 17 which rotate sun gear 22 mounted on shaft 15. By holding carrier 14 stationary with brake 26 a direct overdrive is established. Brake 49 is activated in the rear section 13 of the transmission to produce a power path previously described in connection with FIGS. 2a and 4.

Figure 6:
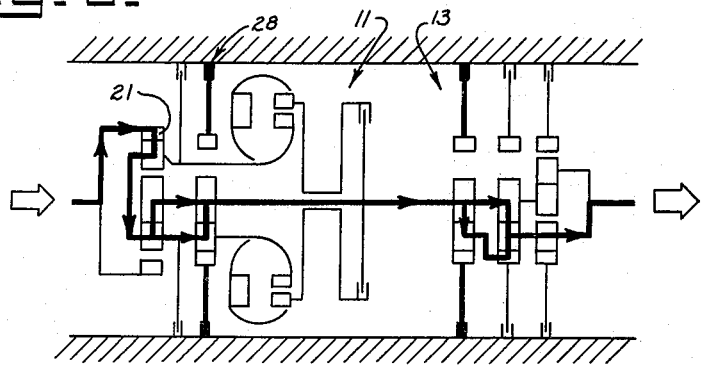
Figure 7:
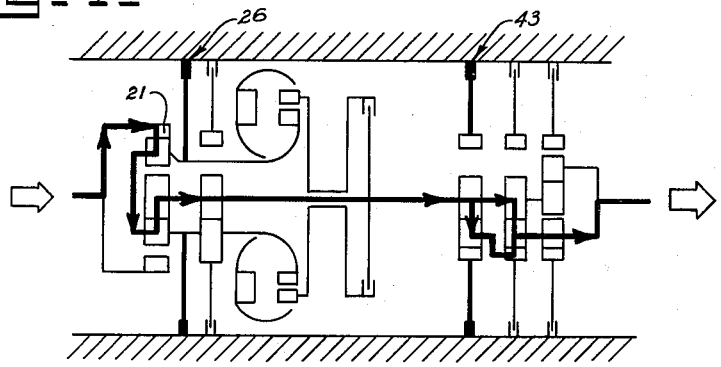

A high speed operating path is illustrated in FIG. 6 and is achieved by activating brakes 28 and 43 to produce the dual planetary drive system in the front section 11, described with reference to FIG. 4, and the high range power path in the rear section 13, as described with reference to FIG. 3. Even higher speed operation is illustrated in FIG. 7 where brake 26 and brake 43 are activated to produce the high speed single planetary stage drive in the front section as described with reference to FIG. 5, and the high range gearing in the rear section, as described with reference to FIG. 3.

It is to be noted that maximum efficiency is obtained in the four higher forward speeds because a mechanical drive condition exists in these speeds and the torque converter is not utilized. The torque converter provides an advantage in addition to high torque output in first reverse and in the first two forward speeds; namely, the important feature of vehicle retardation when desired. Dynamic braking is accomplished by simultaneous engagement of a brake associated with the front section of the transmission, the rotating clutch 34, and a clutch associated with the rear section of the transmission. The severity of such braking is controlled by the particular brakes selected for use with the clutch. Less, but still effective, vehicle retarding is accomplished at reduced throttle with the transmission engaged in a gear which includes the torque converter (the first two gears forward, and first reverse).

We claim:

1. A speed change transmission comprising an input ring gear connected to a source of power,
   a rotatable planet carrier,
   a shaft,
   a first input sun gear on said shaft,
   a first input drive planet set on said carrier engaging said input ring gear and said first input sun gear, a first drive brake selectively operable to lock said carrier against rotation,
a three member torque converter of the stationary housing type including an impeller driven by said carrier and a driven member, and
a rotatable clutch selectively operable to lock said driven member to said shaft.

2. The speed change transmission defined in claim 1 wherein
said brake and said clutch are conditioned to be actuated selectively separately.

3. The speed change transmission defined in claim 1 including
a second sun gear on said shaft,
a rotatable reaction ring gear,
a second drive planet set on said carrier engaging said reaction ring gear and said second sun gear, and
a second brake selectively operable to lock said reaction ring gear against rotation.

4. The speed change transmission defined in claim 1 including
an output member,
a pair of planetary gear trains each operable to transmit power from said shaft to said output member, and
brake means selectively operable to activate one of said pair of planetary gear trains.

5. The speed change transmission defined in claim 1 including
first and second output sun gears on said shaft,
first and second output planet carriers,
first and second output ring gears,
first and second output planets on said first and second output carriers respectively engaging said first and second output sun gears and said first and second output ring gears respectively,
said second output ring gear being carried on said first output carrier to rotate therewith,
an output member being driven by said second output carrier, and
first and second output brake means selectively operable to lock said first and second output ring gears respectively against rotation.

6. The speed change transmission defined in claim 5 including
a reverse planetary transmission selectively actuated to rotate said output member in a direction opposite to that of said shaft.

7. A speed change transmission comprising
a transfer shaft,
drive means for rotating said shaft,
first and second output sun gears on said transfer shaft,
first and second output ring gears,
first and second planet carriers including planet gears respectively engaging said first and second output sun gears and said first and second output ring gears,
said second output ring gear being carried on said first output carrier to rotate therewith,
an output member driven by said second output carrier,
brake means for selectively locking said first and second output ring gears against rotation,
said drive means including:
a first input gear train in continuous driving engagement with said transfer shaft,
a second gear train for driving said transfer shaft,
a three member torque converter of the stationary housing type including a driven member,
means for activating said second gear train,
a clutch selectively operable to lock said driven member to said shaft.

8. A speed change transmission comprising
a transfer shaft,
drive means for rotating said shaft,
first and second output sun gears on said transfer shaft,
first and second output ring gears,
first and second planet carriers including planet gears respectively engaging said first and second output sun gears and said first and second output ring gears,
said second output ring gear being carried on said first output carrier to rotate therewith,
an output member driven by said second output carrier,
brake means for selectively locking said first and second output ring gears against rotation,
said drive means including:
a planet gear carrier,
first and second planet gear sets on said carrier,
first and second drive sun gears on said shaft driven by said first and second planet sets respectively,
first and second ring gears engaged by said first and second planet sets respectively,
a three member torque converter of the stationary housing type including an impeller member rotating with said planet carrier and a driven member,
a first brake for locking said carrier against rotation,
a second brake for locking said second ring gear against rotation, and
a rotatable clutch for locking said driven member to said shaft.

References Cited in the file of this patent
UNITED STATES PATENTS

| | | |
|---|---|---|
| 2,641,144 | Schneider | June 9, 1953 |
| 2,687,657 | Kugel et al. | Aug. 31, 1954 |
| 2,926,543 | Holdeman et al. | Mar. 1, 1960 |
| 3,021,729 | Chambers et al. | Feb. 20, 1962 |
| 3,039,327 | Breting | June 19, 1962 |